United States Patent [19]

Kishi

[11] Patent Number: 4,964,765
[45] Date of Patent: Oct. 23, 1990

[54] CHAMFERING MACHINE

[75] Inventor: Katsunobu Kishi, Tokyo, Japan

[73] Assignee: Nitto Kohki Co., Ltd., Tokyo, Japan

[21] Appl. No.: 482,504

[22] Filed: Feb. 21, 1990

[30] Foreign Application Priority Data

Feb. 27, 1990 [JP] Japan .................. 1-21854[U]

[51] Int. Cl.$^5$ .................. B23C 1/20; B27C 5/10
[52] U.S. Cl. .................. 409/181; 144/117 B; 144/134 D; 408/241.5; 409/218
[58] Field of Search .................. 409/175, 180, 181, 182, 409/184, 218, 138, 134; 144/134 R, 134 D, 117 B, 134 A; 408/241.5, 95

[56] References Cited

U.S. PATENT DOCUMENTS

| 2,452,818 | 11/1948 | Williams | 409/180 |
| 2,599,415 | 6/1952 | Russell | 409/180 |
| 2,910,920 | 11/1959 | Bidart, Jr. | 409/181 |
| 3,443,479 | 5/1969 | Hawley et al. | 409/182 |

FOREIGN PATENT DOCUMENTS

| 123155 | 10/1984 | European Pat. Off. | 409/218 |
| 1074433 | 10/1954 | France | 144/134 D |

*Primary Examiner*—William Briggs
*Attorney, Agent, or Firm*—Nixon & Vanderhye

[57] ABSTRACT

A chamfering machine comprises a casing, a rotating shaft projecting from one end of the casing, a ring-shaped connector enclosing the rotating shaft and having a slit formed parallel to the center axis of the rotating shaft, and also having a downward slope formed on the outer circumference of its lower end portion, a guide base having a ring-shaped boss detachably screwed into the ring-shaped connector, a lock ring detachably screwed onto the ring-shaped connector, the lock ring having an upward slope formed on the inner circumference thereof and slidable on the downward slope of the ring-shaped connector, when the lock ring is rotated and moved in the axial direction of the rotating shaft, to clamp the connector in the center direction of the rotating shaft, to firmly engage the connector with the ring-shaped boss, a cutting chip fixed to the rotating shaft which passes through the ring-shaped boss and having chamfering blades one of which partially projects from the underside of the guide base, and a guide means attached to the rotating shaft and projecting from the underside of the guide base to contact a side surface of a material to be chamfered.

5 Claims, 1 Drawing Sheet

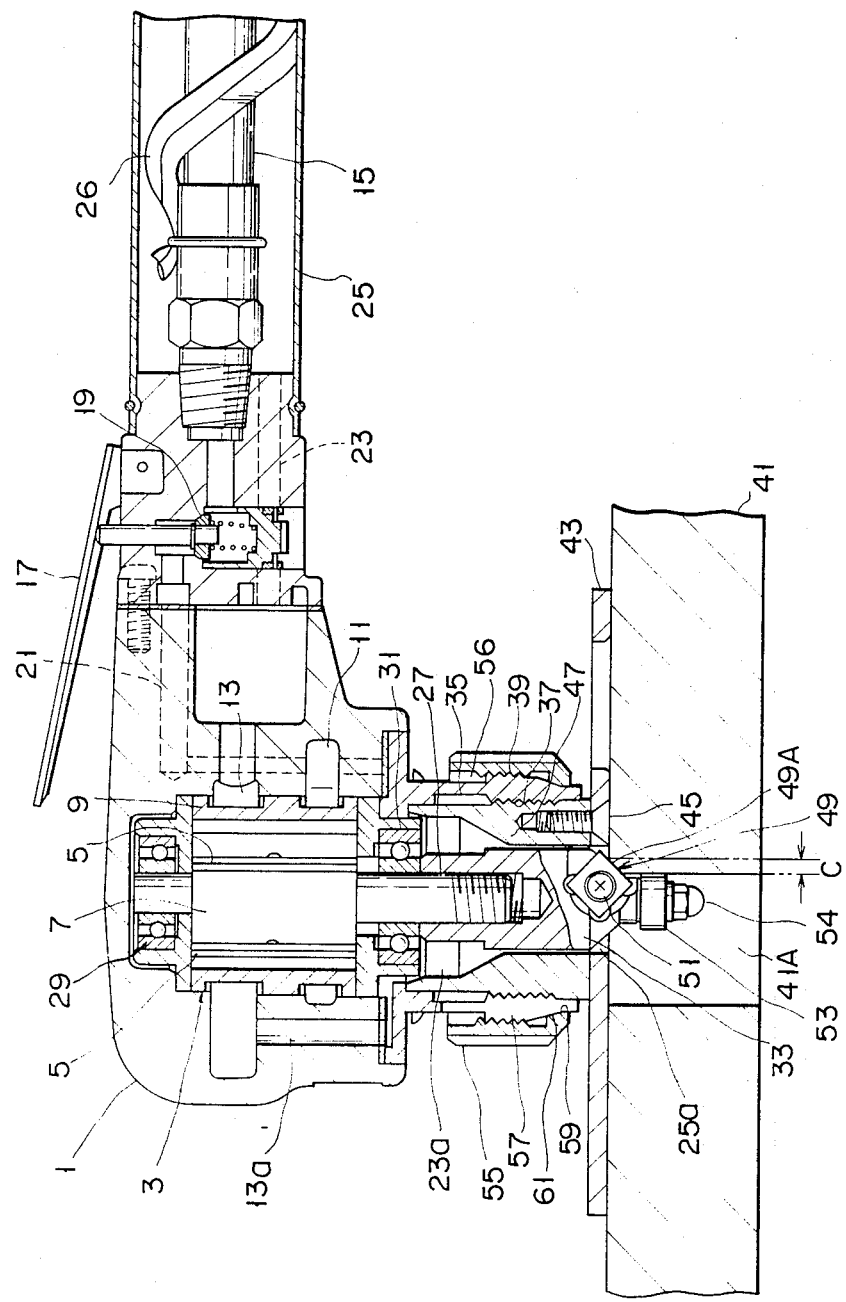

CHAMFERING MACHINE

BACKGROUND OF THE INVENTION

1. Field of the Invention

The present invention relates to a portable chamfering machine capable of chamfering the edge or arris portion of a material to be machined along its outer circumference, and which is also capable of chamfering edge or arris portions of holes or grooves in the material, along inner circumferences of these holes or grooves.

2. Description of the Related Art

A well-known portable chamfering machine for chamfering the edge or arris portion of a material by means of a rotating cutter made up of a series of cutting blades and mounted at the front end thereof is provided with guide faces arranged perpendicular to each other and placed on the edge or arris portion of the material and a guide is provided to expose the cutting blades of the rotating cutter tilted from the guide faces. In the case of this chamfering machine, chamfering is conducted by moving the chamfering machine along the edge or arris portion of the material while keeping the perpendicularly-crossing guide faces of the guide positioned on the edge or arris portion.

In the case of this conventional portable chamfering machine, however, the perpendicularly-crossing guide faces of the guide located adjacent to the rotating cutter constitute an obstacle, as they prevent the chamfering machine from moving smoothly along the inner face of a hole when the edge or arris portion of the hole is to be chamfered, thus reducing the chamfering efficiency.

The author of the present invention has therefore provided in preliminarily-opened Japanese Utility Model Application Sho 63-114293 a chamfering machine including a guide base attached to one end of a housing in which a motor is housed, a rotating shaft projecting from the guide base, a cutting blade fixed to the rotating shaft and projecting from the guide base, and a guide attached to that portion of the rotating shaft below the level at which the cutting blade is attached, and placed in contact with the inner face of a hole formed in a material to be chamfered, or with the curved side of the material. This chamfering machine performs the chamfering of holes and curved sides of a material by being moved with the guide base mounted on a plane face of the material, and the guide thus in contact with the inner face the hole or curved side of the material.

This chamfering machine undoubtedly solves the problem of how to enhance the efficiency of the chamfering process. To further improve the capabilities of the chamfering machine, however, it must also have systems for easily adjusting the amount of material chamfered and enabling a used cutter to be easily replaced by a new one.

SUMMARY OF THE INVENTION

The object of the present invention is to provide a portable chamfering machine capable of more easily chamfering the edge or arris portion of a hole, a groove, or the outer circumference of a material to be chamfered, and which has systems, simpler in construction and easier in operation than conventionally, for adjusting the amount of material chamfered and for exchange a used cutter for a new one.

This object can be achieved by a chamfering machine comprising a casing; a rotating shaft projecting from one end of the casing; a ring-shaped connector enclosing the rotating shaft and having a slit formed parallel to the center axis of the rotating shaft, and also having a downward slope formed on the outer circumference of its lower end portion; a guide base having a ring-shaped boss detachably screwed into the ring-shaped connector; a lock ring detachably screwed onto the ring-shaped connector, the lock ring having an upward slope formed on the inner circumference thereof and slidable on the downward slope of the ring-shaped connector, when the lock ring is rotated and moved in the axial direction of the rotating shaft, to clamp the connector in the center direction of the rotating shaft, to firmly engage the connector with the ring-shaped boss; a cutting chip fixed to the rotating shaft which passes through the ring-shaped boss and having chamfering blades one of which partially projects from the underside of the guide base; and a guide means attached to the rotating shaft and projecting from the underside of the guide base, to contact a side surface of a material to be chamfered.

In order for the amount of the material chamfered by the cutting blade of the cutting chip to be adjusted according to the present invention, the lock ring is loosened to release its slope from the ring-shape connector and the ring-shaped boss screwed into the ring-shaped connector is loosened to allow the guide base to be rotated round the rotating shaft. The amount of the cutting blade projected from the underside of the guide base is thus changed little by little. When the amount of the cutting blade projected is determined a predetermined value, the lock ring is tightened so that the ring-shaped connector can be clamped by the slope of the lock ring to firmly engage the connector with the boss.

The guide base is mounted on a plane face of the material to be chamfered, setting the cutting blade against the edge or arris portion of the outer circumference of the material or of the inner circumference of a hole or groove in the material and contacting the guide member with the side of the material. The rotating shaft is rotated under this state, allowing the cutting blade to chamfer the edge or arris portion of the material while moving the guide member along the side of the material to guide the chamfering machine. A predetermined amount of the material can be thus chamfered.

When the cutting blade of the cutting chip is to be exchanged with a new one, the lock ring is loosened and the ring-shaped boss screwed into the connector is also loosened. The guide base is then rotated and detached from the ring-shaped boss, so that the cutting chip can be completely exposed outside along with its cutting blades. This enables the cutting chip to be more easily replaced with a new one.

According to the chamfering machine of the present invention, the guide member is fixed to that portion of the rotating shaft which is lower than the cutting chip attached thereto and the chamfering machine is guided by the guide member which contacts the inner or outer circumference of the material to be chamfered. Therefore, the edge or arris portion of a hole or curved side of the material which could not be chamfered by the conventional chamfering machine can be easily chamfered by the chamfering machine of the present invention.

Further, the ring-shaped connector for fixing the guide base is provided with slits formed round it at a certain interval and a slope formed on its outer circumference. When the lock ring is tightened, sliding its slope on the slope of the connector, the ring-shaped connector is clamped by the lock ring to hold the guide base firm. When the lock ring is loosened, sliding its slope on the slope of the connector, the ring-shaped connector is also loosened to allow the guide base to be easily rotated and detached from the connector. This enables the amount of the material chamfered to be more easily adjusted. Furthermore, the system for adjusting the amount of the material chamfered is quite simpler, comprising the ring-shaped boss, ring-shaped connector and lock ring coaxially screwed into the others in this order. Therefore, the height of the adjusting system can be made smaller, thereby enabling the length of the rotating shaft to be made shorter accordingly. This makes smaller the bending moment which acts on the rotating shaft, thereby enabling the vibration and noise of the chamfering machine to be further reduced in the chamfering process.

Still further, the cutting chip can be more easily replaced by a new one when the lock ring is loosened and the guide base is thus detached from the connector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

The drawing is a sectional front view showing an example of the chamfering machine according to the present invention.

The accompanying drawing, which is incorporated in and constitutes a part of the specification, illustrates a presently preferred embodiment of the invention and, together with the general description given above and the detailed description of the preferred embodiment given below, serves to explain the principles of the invention.

DETAILED DESCRIPTION OF THE PREFERRED EMBODIMENT

According to an example of the chamfering machine of the present invention, air motor 3 which serves as drive source is housed in L-shaped casing 1. Air motor 3 includes plural blades 5 elastically urged in the centrifugal direction of the motor while this motor is being rotated, eccentric rotor 7 provided with radially-arranged blades 5, and cylinder 9 in which rotor 7 is rotatably held. Eccentric rotor 7 is driven by repeating supply and exhaust of compressed air into and out of cylinder 9. More specifically, these spaces which are defined by blades 5 and the inner circumference of cylinder 9 are expanded by compressed air supplied through port 11 while air in those spaces which are defined by other blades 5 and the inner circumference of cylinder 9 is compressed by the former expanded spaces and exhausted out of cylinder 9 through port 13. Supply and exhaust of compressed air are thus repeated. Compressed air is supplied to air motor 3, passing through hose 15 connected to the rear end of casing 1, valve 19 selectively operated by lever 17 to introduce compressed air into air motor 3, passage 21 connected to valve 19, and port 11. Air exhausted from air motor 3 is introduced to hose 25 and exhaust opening 25a, passing through ports 13 and 13a and passages 23 and 23a, respectively. Air supply and exhaust hoses 15 and 25 are made substantially coaxial, keeping air supply hose 15 positioned in the center of air exhaust hose 25, and sponge 26 which serves as silencer is spirally wound round air exhaust hose 15.

Motor shaft 27 for air motor 3 is made integral to rotor 7 and supported in casing 1 by a pair of ball bearings 29 and 31. Rotating shaft 33 is screwed onto that portion of motor shaft 27 which is projected outside from the lower end of casing 1. Ring-shaped connector 35 is fixed, coaxial with rotating shaft 33, to the lower end of casing 1. Female and male screw threads 37 and 39 are formed on inner and outer circumferences of ring-shaped connector 35.

Male screw thread 45 on the outer circumference of ring-shaped boss 47 of guide base 43 which is mounted on the surface of material 41 to be machined is engaging with female screw thread 37 of ring-shaped connector 35, so that guide base 43 can be detachably fixed to ring-shaped connector 35. Rotating shaft 33 is projected outside from the bottom of guide base 43, passing through ring-shaped boss 47, and square cutting chip 49 having cutting blades 49A at four sides thereof is freely detachably fixed to this projected portion of rotating shaft 33 in such a way that one side of chip 49 is tilted relative to the underside of guide base 43 at an angle of 45°, for example, or that a part of chip 49 is projected outside from the underside of guide base 43. Guide bearing 53 which can be rotated contacting the side of material 41 is fixed to the front end of rotating shaft 33 by means of cap nut 54.

Amount C of material 41 chamfered by cutting blade 49A of cutting chip 49 is determined by a horizontal distance extending from a point where cutting blade 49A crosses the underside of guide base 43 to another point where the outer circumference of guide bearing 53 is contacted with the inner circumference of, say, a hole in material 41, when cutting chip 49 is directed front as shown in the drawing. When ring-shaped boss 47 screwed into ring-shaped connector 35 is rotated together with guide base 43 to move guide base 43 in the axial direction of rotating shaft 33, in other words, when that amount of cutting chip 49 which is projected outside from the underside of guide base 43 is adjusted, therefore, the amount of material 41 chamfered by cutting blade 49A of cutting chip 49 can be adjusted. The amount of guide base 43 moved this time can be readily determined by the pitch of female screw thread on the outer circumference of ring-shaped connector 35 and by the number of guide base 43 rotated. When ring-shaped boss 47 is released from ring-shaped connector 35, cutting chip 49 is completely exposed outside.

Female screw thread 56 on the inner circumference of lock ring 55 is detachably engaged with male screw thread 39 of ring-shaped connector 35. Ring-shaped connector 35 and lock ring 55 are arranged in the following manner to detachably fix ring-shaped boss 47 of guide base 43 onto the inner circumference of ring-shaped connector 35. Namely, slits or three slits 57, for example, extending parallel to the axial center of ring-shaped connector 35 are formed round connector 35 at a certain interval and lock ring 55 is screwed onto the thread portion of ring-shaped connector 35. In addition, gentle downward slope 59 is formed on the lower outer circumference of ring-shaped connector 35. On the other hand, gentle upward slope 61 which is tilted at same angle as slope 59 is is formed on the lower inner circumference of lock ring 55, and when lock ring 55 is rotated to move upward in the axial direction of rotating shaft 33, its upward slope 61 is slid on the downward slope 59 of ring-shaped connector 35 to press or clamp connector 35 in the center of rotating shaft 33. When upward slope 61 of lock ring 55 slides on downward slope 59 of connector 35 to clamp connector 35 toward the center of rotating shaft 33 or to elastically transform or shrink the diameter of connector 35 a little, screw connection between ring-shaped boss 47 and connector 35 can be made more solid.

When the amount of material 41 chamfered by cutting blade 49A of cutting chip 49 is to be adjusted, lock ring 55 is loosened to release upward slope 61 of lock ring 55 from downward slope 59 of ring-shaped connector 35, so that screw connection between ring-shaped connector 35 and boss 47 can be loosened. Ring-shaped boss 47 screwed into ring-shaped connector 35 is then rotated together with guide base 43 to change that amount of cutting blade 49A which is projected from the underside of guide base 43 to meet the amount of material 41 intended to be chamfered by cutting blade 49A of cutting chip 49. Lock ring 55 is then tightened to clamp or elastically transform downward slope 59 of connector 35 a little toward the center of rotating shaft 33 by upward slope 61 thereof so that screw connection between ring-shaped boss 47 and connector 35 can be made solid.

When the amount of material 41 chamfered by cutting blade 49A of cutting chip 49 is thus set, air motor 3 is made operative to rotate shaft 33. In a case where the rim or arris portion of hole 41A in material 41 is to be chamfered, the underside of guide base 43 is placed on the surface of material 41 while inserting that front end portion of now-rotating shaft 33 which is projected from the underside of guide base 43 into hole 41A of material 41. When the chamfering machine is then moved contacting the outer circumference of guide bearing 53 with the inner surface of hole 41A, guide bearing 53 is guided along the inner surface of hole 41A to enable cutting blade 49A, which is fixed to rotating shaft 33 along with guide bearing 53, to chamfer the rim or arris portion of hole 41A. When the rim or arris portion of the outer circumference or curved side of material 41 is to be chamfered, guide bearing 53 is also guided along the outer circumference or curved side of material 41 so that cutting blade 49A fixed to rotating shaft 33 together with guide bearing 53 can cut the rim or arris portion of the outer circumference or curved side of material 41 to achieve a predetermined chamfering of material 41.

When cutting chip 49 is to be replaced by a new one, lock ring 55 is loosened and ring-shaped boss 47 screwed into ring-shaped connector 35 is rotated together with guide base 43 to release from casing 1. Cutting chip 49 is thus completely exposed outside and when it is under this state, its screw 51 is loosened to replace it with a new one or to rotate it at an angle of 90° to position a not-used cutting blade to be used.

It should be understood that the present invention is not limited to the above-described embodiment and that various changes and modifications can be made without departing from the spirit and scope of the present invention. For example, the transmission of power for driving the cutter chip is not limited to the one directly done through the motor shaft but it may be done through gears and the like. Further, the source for rotating the cutter chip is not limited to the air motor but it may be a hydraulic or electric motor. Furthermore, the guide bearing may be a ring or plate not rotated or it may be formed directly on the rotating shaft itself of the motor.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A chamfering machine comprising:
   a casing;
   rotating shaft projecting from one end of the casing;
   a ring-shaped connector enclosing the rotating shaft and having a slit formed parallel to the center axis of the rotating shaft, and also having a downward slope formed on the outer circumference of its lower end portion;
   a guide base having a ring-shaped boss detachably screwed into the ring-shaped connector;
   a lock ring detachably screwed onto the ring-shaped connector, the lock ring having an upward slope formed on the inner circumference thereof and slidable on the downward slope of the ring-shaped connector, when the lock ring is rotated and moved in the axial direction of the rotating shaft, to clamp the connector in the center direction of the rotating shaft, to firmly engage the connector with the ring-shaped boss;
   a cutting chip fixed to the rotating shaft which passes through the ring-shaped boss and having chamfering blades one of which partially projects from the underside of the guide base; and
   guide means attached to the rotating shaft and projecting from the underside of the guide base to contact a side surface of a material to be chamfered.

2. The chamfering machine according to claim 1, further including a motor housed in the casing, to rotate the rotating shaft.

3. The chamfering machine according to claim 2, wherein said motor has an air motor.

4. The chamfering machine according to claim 1, wherein the amount of the material chamfered by the cutting blade of the cutting chip is set by a distance horizontally extending from a point where the cutting blade of the cutting chip crosses a plane which is on same level as an underside surface of the guide base to a side surface of the guide means attached to the rotating shaft.

5. The chamfering machine according to claim 4, wherein said horizontally extending distance is adjusted by moving the guide base in the axial direction of the rotating shaft.

* * * * *